United States Patent

Amer et al.

Patent Number: 6,141,460
Date of Patent: Oct. 31, 2000

[54] METHOD FOR DETECTING EDGES IN AN IMAGE SIGNAL

[75] Inventors: Aishy Amer, Dortmund; Steffen Reichert, Ratingen, both of Germany

[73] Assignee: Siemens Aktiengesellschaft, Munich, Germany

[21] Appl. No.: 09/266,431

[22] Filed: Mar. 11, 1999

Related U.S. Application Data

[63] Continuation of application No. PCT/DE97/01850, Aug. 25, 1997.

[51] Int. Cl.[7] .............................. G06K 9/44; G06K 9/46; G06K 9/40; G06T 5/30; H04N 1/409
[52] U.S. Cl. ........................ 382/257; 382/266; 382/275; 382/199; 382/205; 382/237
[58] Field of Search .................................... 382/257, 256, 382/258, 259, 266, 199, 205, 237, 242; 358/447, 455, 462

[56] References Cited

U.S. PATENT DOCUMENTS

| | | |
|---|---|---|
| 4,477,926 | 10/1984 | Linger et al. . |
| 4,481,664 | 11/1984 | Linger et al. . |
| 4,866,785 | 9/1989 | Shibano ................................. 382/257 |
| 4,980,923 | 12/1990 | Kawamoto et al. ...................... 382/25 |
| 5,438,636 | 8/1995 | Surka . |
| 5,452,367 | 9/1995 | Bick et al. . |
| 5,537,485 | 7/1996 | Nishikawa et al. . |
| 5,680,485 | 10/1997 | Loce et al. ............................. 382/257 |
| 5,953,461 | 9/1999 | Yamada .................................. 382/266 |

OTHER PUBLICATIONS

International Publication No. WO 95/15537 (Giger et al.), dated Jun. 8, 1995.
"Praxis der Digitalen Bildverarbeitung und Mustererkennung" (Haberäcker), Carl Hanser Verlag München/Wien, 1985, p. 108.
"Boundary–Constrained Morphological Skeleton Minimization and Skeleton Reconstruction" (Pai et al.), IEEE Transactions on Pattern Analysis And Machine Intelligence, vol. 16, No. 2, Feb. 1994, pp. 201–208;.
"Analysis of Thinning Algorithms Using Mathematical Morphology" (Jang et al.), IEEE Transactions on Pattern Analysis and Machine Intelligence, vol. 12, No. 6, Jun. 1990, pp. 541–551.

*Primary Examiner*—Scott Rogers
*Attorney, Agent, or Firm*—Herbert L. Lerner; Laurence A. Greenberg; Werner H. Stemer

[57] ABSTRACT

An edge detection method employs binary morphological erosion. A binary image is generated from the gray-scale-value input image. A structure element is guided in a step-by-step manner across the binary image and generates an eroded binary image in accordance with an erosion rule. By forming the difference between the binary image and the eroded binary image, an output image containing the edges is generated. An output image which contains masked edges is generated through the use of a further erosion rule. The further erosion rule is based on a gray-scale value threshold and is applied to the eroded binary image to form a twice-eroded binary image. The difference between the twice-eroded binary image and the binary image forms the image which contains masked edges.

8 Claims, 2 Drawing Sheets

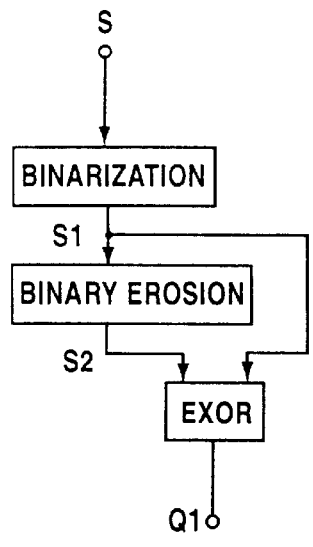
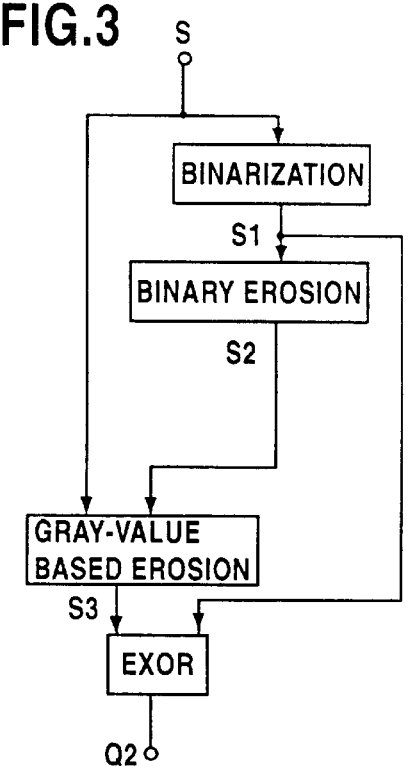
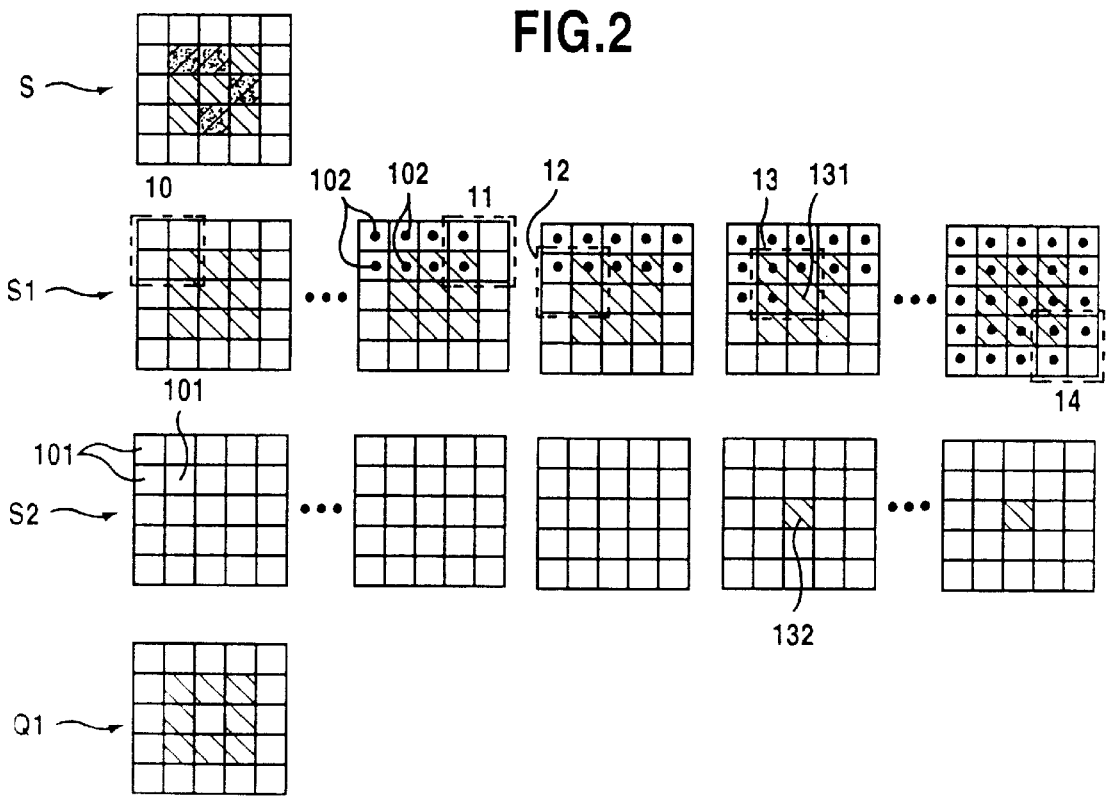

6,141,460

METHOD FOR DETECTING EDGES IN AN IMAGE SIGNAL

CROSS-REFERENCE TO RELATED APPLICATION

This is a continuation of copending International Application PCT/DE97/01850, filed Aug. 25, 1997, which designated the United States.

BACKGROUND OF THE INVENTION

Field of the Invention

The invention relates to a method for detecting edges in an image signal.

In image processing, in particular television signal processing, the detection of edges is necessary for quite a number of digital signal processing methods. Edge detection is for example used for object recognition, for motion estimation, for eliminating flicker, or for improving the image quality by, for example, carrying out edge crispening or noise reduction. The quality of these signal processing methods depends to a large extent on the performance of the edge detection in the edge detector. It is in particular desirable to detect the edges with as much noise immunity as possible and with as much positional accuracy as possible.

Conventional edge detectors in television signal processing operate according to the principle of gradient formation. For this purpose, a sudden change in brightness in an image is determined basically by a difference formation. In the Laplace method, the second derivative of the gradient is used. Furthermore, different combinations of these methods are possible. If appropriate, convolution operations and weighting operations in longitudinally different directions can be included in these methods. The increased noise sensitivity on account of the difference formation is problematic in these methods. The edges determined may be more than one pixel wide, which leads to positional inaccuracies. There is no efficient determination of edges at masking locations. The formation of derivatives means that a high computation effort is necessary, and wide edges likewise lead to an increased computation effort.

SUMMARY OF THE INVENTION

It is accordingly an object of the invention to provide a method for detecting edges in an image, which overcomes the above-mentioned disadvantages of the heretofore-known methods of this general type and which is in particular largely immune to noise and which, moreover, provides accurate positions of the edges.

With the foregoing and other objects in view there is provided, in accordance with the invention, a method for detecting edges in an image signal, the method which comprises:

a) providing an input image;
b) generating, from the input image, a binary image having set and unset pixels;
c) generating an intermediate image from the binary image by
  c1) providing a structure element encompassing a plurality of pixels of the binary image;
  c2) processing the plurality of pixels of the binary image encompassed by the structure element and forming positionally corresponding pixels of the intermediate image in accordance with an erosion rule which defines resetting pixels of the intermediate image corresponding to the structure element if at least one of the plurality of pixels encompassed by the structure element is unset, and setting the pixels of the intermediate image corresponding to the structure element which have not been reset, if the plurality of pixels encompassed by the structure element are set;
  c3) moving the structure element in a step-by-step manner within the binary image and repeating step c2) until the intermediate image is generated; and
d) forming a difference image with the binary image and the intermediate image, the difference image containing edges.

In accordance with another mode of the invention, a threshold value for the input image is determined from an image content in an image-by-image manner; and step b) includes comparing a respective brightness value of a respective pixel of the input image with the threshold value.

In accordance with a further mode of the invention, the step of determining the threshold value includes determining partial threshold values of the input image in a block-by-block manner, and calculating an average of the partial threshold values for determining the threshold value.

In accordance with another mode of the invention, the step of determining the partial threshold values includes determining a respective one the partial threshold values by determining a plurality of frequencies for a plurality of gray-scale values within a respective block, and calculating an average of the plurality of frequencies.

In accordance with yet another mode of the invention, the structure element encompasses four pixels disposed directly next to one another.

With the objects of the invention in view there is also provided a method for detecting edges in an image signal, the method which comprises:

a) providing an input image;
b) generating, from the input image, a binary image having set and unset pixels;
c) generating a first intermediate image from the binary image by
  c1) providing a first structure element encompassing a plurality of pixels of the binary image;
  c2) processing the plurality of pixels of the binary image encompassed by the first structure element and forming positionally corresponding pixels of the first intermediate image in accordance with a first erosion rule which defines resetting pixels of the first intermediate image corresponding to the first structure element if at least one of the plurality of pixels encompassed by the first structure element is unset, and setting the pixels of the first intermediate image corresponding to the first structure element which have not been reset, if the plurality of pixels encompassed by the first structure element are set;
  c3) moving the first structure element in a step-by-step manner within the binary image and repeating step c2) until the first intermediate image is generated;
d) generating a second intermediate image from the first intermediate image by
  d1) providing a second structure element encompassing a plurality of pixels of the first intermediate image;
  d2) processing the plurality of pixels of the first intermediate image encompassed by the second structure element and forming positionally corresponding pixels of the second intermediate image in accordance with a second erosion rule, which defines resetting each of the plurality of pixels of the second intermediate image corresponding to the second structure element if a comparison condition with regard to a brightness value difference is fulfilled for a plurality of pixels of the input image corresponding to the second structure element;

d3) moving the second structure element in a step-by-step manner within the first intermediate image and repeating step d2) until the second intermediate image is generated; and e) forming a difference image with the binary image and the second intermediate image, the difference image containing edges.

In accordance with another mode of the invention, the brightness value difference is calculated from horizontally and vertically adjacent pixels of the input image corresponding to the second structure element of the first intermediate image.

In accordance with yet another mode of the invention, the first structure element and the second structure element each encompass four pixels disposed directly next to one another.

The edge detection method according to the invention uses morphological erosion and provides—except at masking locations—only edges which are a single pixel wide. The edges are positionally accurate. Largely closed edges are detected, so that good results can be ensured e.g. for a subsequent object recognition. The erosion rule can be implemented using simple circuit devices which correspond to basic mathematical operators, with the result that a substantially lower computation effort is required in comparison with gradient-based methods or Laplace-based methods. In addition, double edges present between two objects as a result of the masking can be identified substantially in their entirety through the use of subsequent gray-scale-value-based morphological erosion. The last-mentioned embodiment yields edges having a width of usually two pixels at masking locations.

Other features which are considered as characteristic for the invention are set forth in the appended claims.

Although the invention is illustrated and described herein as embodied in a method for detecting edges in an image signal, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a diagram illustrating the fundamental sequence of the method of binary edge detection according to the invention;

FIG. 2 shows schematic diagrams representing images at various steps of a binary erosion;

FIG. 3 is a diagram illustrating the fundamental sequence of the method according to the invention with a gray-scale-value-based erosion.

DESCRIPTION OF THE PREFERRED EMBODIMENTS

Figure 4:
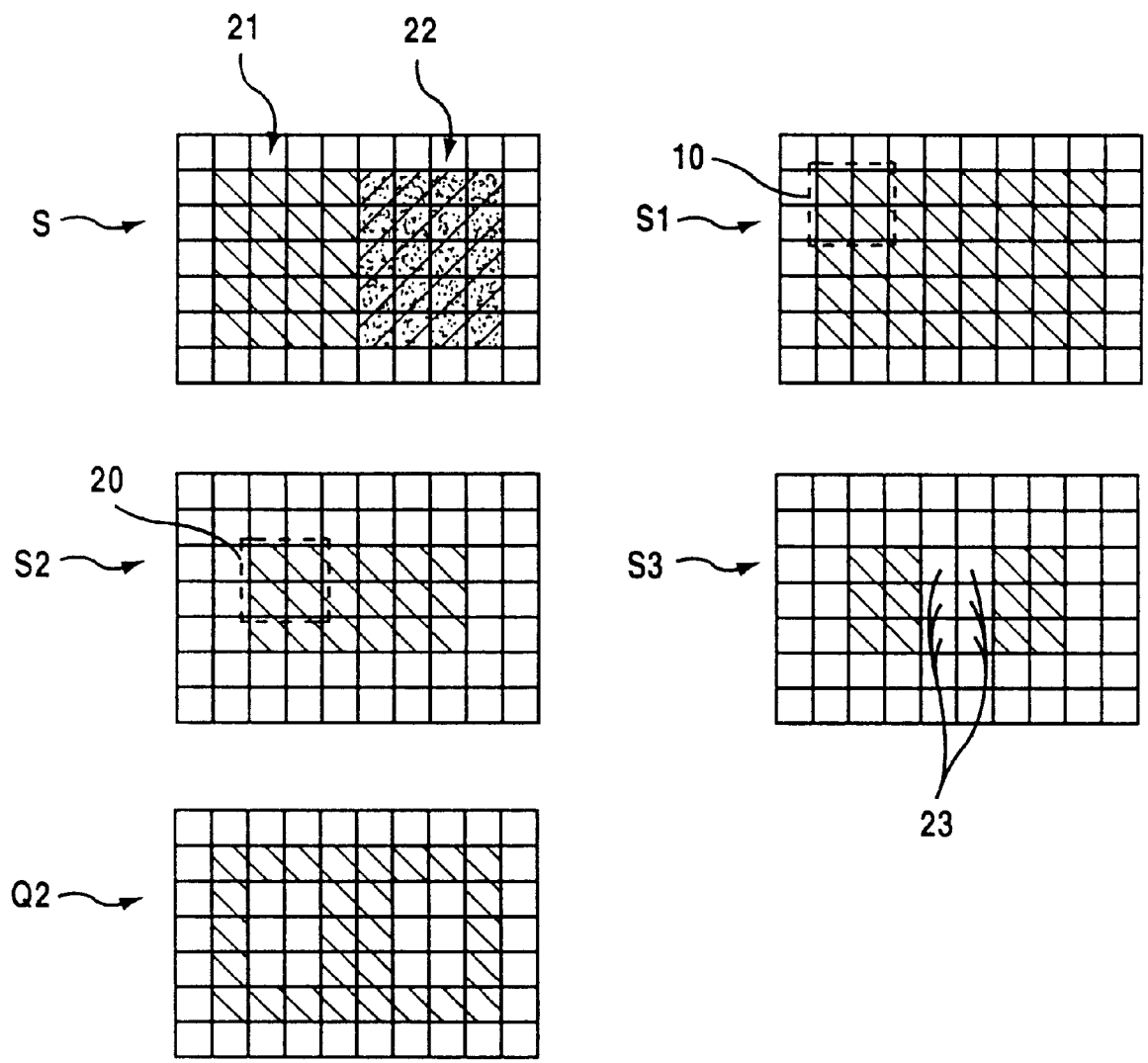
FIG. 4 shows schematic diagrams representing images at various steps during the gray-scale-value-based erosion.

Referring now to the figures of the drawings in detail and first, particularly, to FIG. 1 thereof, there is shown an image signal S, which is supplied to the input of the sequence of the method shown in FIG. 1. The image signal may be a progressive or interlaced image divided into lines. The individual pixels each include a brightness value. First of all the brightness information of the input image is reduced to a binary image S1, with the result that only set and unset (not set) pixels are present. Set pixels belong to the object and unset pixels to the background. The binary image is eroded in accordance with an erosion rule, that is to say it is shrunk, such that a binary, eroded intermediate image S2 is thus produced. The intermediate image S2 is compared with the input-side binary image S1, for example through the use of an EXCLUSIVE-OR function or by a difference formation. This produces the output image Q1 containing only the edges. The edge has a width of one pixel.

In order to also recognize edges that are within binary segments, a gray-scale-value-based erosion is carried out in accordance with FIG. 3. For this purpose, the binary image S2 which has already been subjected to binary erosion has an additional erosion applied to it, namely at those locations at which sudden gray-scale value changes of a predetermined magnitude can be ascertained in the input-side gray-scale value image S. Through the use of a comparison between the binary image S1 and the gray-scale-value-based erosion image S3, for example through the use of an EXCLUSIVE-OR function or by a difference formation, the output image Q2 is generated. The output image Q2 contains the outer edges and, in addition, edges which are present between objects on account of masking.

The method is described in detail below. In order to reduce the input image information to a binary image, each pixel is compared with a threshold value. It is expedient to perform dynamic threshold value adaptation for the images of the image sequence contained in the input signal S. For this purpose, a dedicated gray-scale value threshold is determined for each image, in order to subsequently ascertain image areas in which the gray-scale value level lies above or below this threshold. The gray-scale value threshold is adapted during the image sequence, and is preferably calculated separately for each image.

The frequency of different gray-scale values is determined within the image. This is expediently done, for a threshold value determination which is adapted to the image contents, separately for individual blocks into which the image is divided. For each distribution within a block, the available range of gray-scale values is divided into a number of, by way of example, five identical ranges. Within each range, the most frequently occurring gray-scale value in this range is determined. Furthermore in each block a local average gray-scale value is calculated from the frequencies of all the gray-scale values. The threshold value for the entire image is calculated as the average value of the average gray-scale values determined for each block and the most frequently occurring gray-scale values determined in each block. It has been found that this "mixed" average gray-scale value affords good adaptation to small, local brightness and contrast fluctuations in the image. The threshold value adapts to the brightness fluctuations occurring in real image sequences, so that a good result for the binarization and the subsequent edge detection is achieved.

For the binary erosion, a structure element 10 (FIG. 2) is guided in a step-by-step manner across the binary image S1, the pixels located in the structure element being converted, in accordance with an erosion rule, into corresponding pixels of the intermediate image S2. Corresponding pixels means that these pixels of the intermediate image S2 are positionally identical to the pixels encompassed by the structure element of the binary image, in other words corresponding pixels are pixels that have the same position in the binary image and in the intermediate image. In the exemplary embodiment described, the structure element is a square having four pixels; the step size is in each case one pixel in the horizontal direction; at the end of a line, the square element jumps to the beginning of the next line. The erosion rule for the pixels within the structure element reads as follows: "If not all the pixels in a structure element are set, then all these pixels are eroded, i.e. reset. If all the pixels within the structure element are set, then only those pixels which have not already been eroded beforehand are set". Expediently, in the first step, the eroded pixels are marked either in the binary image S1 or in the intermediate image S2 and, in the second step, only those pixels which are not marked as having been eroded are set. This means that the erosion rule is not recursive.

Set pixels are in this case, those which belong to an object; unset or reset pixels are those pixels which belong to the background. The structure element is relatively small and the erosion rule can be realized using fundamental logical operations. The required computation outlay is therefore low.

The binary edge detection method according to FIG. 1 will be explained once again step-by-step using the concrete exemplary embodiment in FIG. 2. The input-side image S encompasses five pixels in both the horizontal and vertical directions, the central pixels containing gray-scale values which can be assigned to an object, while the pixels along the margins can be assigned to the background. The line designated by S1 shows the image which has already been binarized in various processing steps. The line S2 shows the binary-eroded image relating to the processing phases illustrated in the line S1. The image Q1 is the output image, which contains the edge information. The structure element, which encompasses four pixels, is guided across the binary image S1 in a pixel-by-pixel manner. Five different positions 10 . . . 14 of the structure element are shown in FIG. 2. In the starting position 10 it is ascertained using the erosion rule that not all the pixels in the structure element are set. Consequently, the pixels 101 in the binary-eroded image S2 of this processing phase, these pixels correspond to this position of the structure element, are eroded, i.e. reset, to the background gray-scale value. In the binary image S1, these pixels are identified as having been eroded (reference symbol 102). All the pixels are eroded during the step-by-step sweep across the entire first line. For this purpose, by way of example, FIG. 2 illustrates the position 11 of the structure element at the end of the line. Likewise, all the pixels are eroded in the first position 12 of the structure element in the second line. Up to this point, the pixels of the binary-eroded image S2 which have already been processed are all eroded. In the position 13 of the structure element, it is ascertained, in accordance with the erosion rule, that all the pixels of the square element are set, i.e. belong to the object; the only pixels which are set are those which have not been eroded beforehand, i.e. are not marked as having been eroded in the image S1 or alternatively in the image S2 (not illustrated). This is the pixel 131 in the binary image S1 of this phase of the representation, which pixel is set as the pixel 132 in the eroded image S2. As the method progresses, the method yields, in accordance with the erosion rule, that all the pixels except for pixel 131 are reset to the background gray-scale value. The position 14 of the structure element shows the last position thereof in the image section. The binary-eroded image S2 remaining after the binary erosion is an image in which only the pixel at the location 132 is set. The image Q1 is produced by forming the difference between the binary image on the input side and the complete eroded image. The image Q1 contains the margin of the binary object, the edge being one pixel wide.

The edge detection described above is based on binary erosion and can be used only to ascertain edges at the margin of binary segments. Edges situated within binary segments are not detected, but are of importance for identifying a masking. For this purpose, in accordance with FIG. 3, a gray-scale-value-based erosion is additionally carried out as follows: points at which masking is ascertained are eroded within binary segments as well. For this purpose, a gray-scale value difference between adjacent pixels of the structure element is determined and the difference is compared with a threshold value. A gray-scale value difference being above the threshold value indicates that an edge runs through the structure element. The determination of the threshold is dependent on the specific implementation. With a range of gray-scale values of 0 . . . 255, for example, a gray-scale value threshold of 20 to 30 has proved to be expedient.

The structure element is guided synchronously across the already eroded intermediate image S2 and also across the gray-scale-value input image S. It is then determined whether a gray-scale value difference which lies above the predetermined gray-scale value threshold is present between adjacent pixels within the structure element, so that it can be assumed that a masked edge runs through the structure element. Expediently, this evaluation is carried out only within an object, that is to say when all four pixels corresponding to the structure element in the binary image are set. In this case, the gray-scale value difference is determined from the pixels of the gray-scale-value input image S. Expediently, a mean value is calculated from a plurality of gray-scale value differences between adjacent pixels. For this purpose, within the pixels corresponding to the structure element, the respective gray-scale value difference between the horizontally adjacent pixels is calculated, and from this a first average gray-scale value. Subsequently, a respective gray-scale value difference is calculated from the vertically adjacent pixels of the structure element, and from this a second average gray-scale value. A total difference between the average gray-scale values is formed from the first and second average gray-scale values and compared with the predetermined threshold. If this difference lies above the predetermined gray-scale value threshold, the gray-scale value edge runs horizontally or vertically in the structure element. If no horizontal or vertical edge profile has been found, gray-scale value differences between the pixels which are diagonally adjacent in the structure element are calculated. A total difference is again formed from these two differences. If this difference lies above the predetermined threshold value, this means that a corner configuration is present, that is to say that only one pixel in the structure element is set or only one pixel is reset. The erosion rule of the gray-scale-value-based erosion then reads as follows: "If at least one of the threshold value comparisons yields a total difference lying above the threshold value, pixels corresponding to the structure element in the image, that has already been subjected to binary erosion, are eroded, that is to say reset to the background gray-scale value. Otherwise the pixels are maintained unchanged". As illustrated in FIG. 3, after the binary and gray-scale-value-based erosion, the image S3 is combined with the binarized image S1 by EXCLUSIVE-OR logic combination or difference formation.

FIG. 4 illustrates various image contents of the image signals occurring in FIG. 3, in each case after the processing of the method blocks shown therein. The gray-scale-value-based erosion method starts from the input image signal S, which has a marginal background having a width of one pixel and two abutting objects 21, 22 having different gray-scale values. The binary image S1 is obtained from the gray-scale-value input image S by binarization, wherein the binary image contains an area of set pixels which encompasses the objects 21, 22 and a background of unset pixels at the margin. The binary-eroded image S2 is obtained from the binary image S1 by binary erosion using the structure element 10, one position of which is indicated in FIG. 4. The object of the binary-eroded image S2 has an area of set pixels which is reduced by one pixel compared to the area of the binary image S1 formed from set pixels. Through the use of a further structure element 20, which is illustrated for one position in the binary-eroded image S2, the image S3 which is eroded in a gray-scale-value-based manner is obtained from the binary-eroded image S2. A sudden gray-scale value change running vertically between the objects 21, 22 in the input image S is thus ascertained. In the gray-scale-value-based eroded image S3, the pixels 23 at the vertical gray-scale value edge between the objects 21, 22 are, with respect to the binary-eroded image S2, reset to the background gray-scale value within the object that has already been subjected to binary erosion. The output image Q2 is obtained by difference formation or EXCLUSIVE-OR logic combination between the image S3 which is eroded in a gray-scale-value-based manner and the binary image S1. The output image contains both the outer edges of the objects 21, 22 as well as the edge which is present between the objects 21, 22 as a result of the masking. The outer edge is one pixel wide and the masking edge is two pixels wide.

The edges which have been detected in the manner described above are processed further in edge-based signal processing methods. By way of example, the contour points are interlinked with one another to form objects. With the object information being taken into account, use is made in a motion estimator or motion detector, for example, in order to increase the accuracy of the motion vectors. Experience has shown that motion vectors determined from pixel differences at the object margin are subject to inaccuracies. Through the use of the object recognition, a majority motion vector is therefore determined from the individual motion vectors of the pixels of an object as described above, and the potentially erroneous motion vectors differing from the majority motion vector are replaced by the majority motion vector.

The method for detecting the edges in accordance with the invention yields positionally accurate, gap-free edges of a width of one pixel at the object margin in conjunction with a low degree of noise sensitivity and good detection reliability. Double edges are yielded at locations at which objects are masked. These results are achieved by the small structure element to be used as well as by the simple erosion rule with relatively little computation outlay in comparison with conventional solutions.

We claim:

1. A method for detecting edges in an image signal, the method which comprises:
    a) providing an input image;
    b) generating, from the input image, a binary image having set and unset pixels;
    c) generating an intermediate image from the binary image by
        c1) providing a structure element encompassing a plurality of pixels of the binary image;
        c2) processing the plurality of pixels of the binary image encompassed by the structure element and forming positionally corresponding pixels of the intermediate image in accordance with an erosion rule which defines resetting pixels of the intermediate image corresponding to the structure element if at least one of the plurality of pixels encompassed by the structure element is unset, and setting the pixels of the intermediate image corresponding to the structure element which have not been reset, if the plurality of pixels encompassed by the structure element are set;
        c3) moving the structure element in a step-by-step manner within the binary image and repeating step c2) until the intermediate image is generated; and
    d) forming a difference image with the binary image and the intermediate image, the difference image containing edges.

2. The method according to claim 1, which comprises determining a threshold value for the input image from an image content in an image-by-image manner; and wherein step b) includes comparing a respective brightness value of a respective pixel of the input image with the threshold value.

3. The method according to 2, wherein the step of determining the threshold value includes determining partial threshold values of the input image in a block-by-block manner, and calculating an average of the partial threshold values for determining the threshold value.

4. The method according to claim 3, wherein the step of determining the partial threshold values includes determining a respective one the partial threshold values by determining a plurality of frequencies for a plurality of gray-scale values within a respective block, and calculating an average of the plurality of frequencies.

5. The method according to claim 1, wherein the structure element encompasses four pixels disposed directly next to one another.

6. A method for detecting edges in an image signal, the method which comprises:
    a) providing an input image;
    b) generating, from the input image, a binary image having set and unset pixels;
    c) generating a first intermediate image from the binary image by
        c1) providing a first structure element encompassing a plurality of pixels of the binary image;
        c2) processing the plurality of pixels of the binary image encompassed by the first structure element and forming positionally corresponding pixels of the first intermediate image in accordance with a first erosion rule which defines resetting pixels of the first intermediate image corresponding to the first structure element if at least one of the plurality of pixels encompassed by the first structure element is unset, and setting the pixels of the first intermediate image corresponding to the first structure element which have not been reset, if the plurality of pixels encompassed by the first structure element are set;
        c3) moving the first structure element in a step-by-step manner within the binary image and repeating step c2) until the first intermediate image is generated;
    d) generating a second intermediate image from the first intermediate image by
        d1) providing a second structure element encompassing a plurality of pixels of the first intermediate image;
        d2) processing the plurality of pixels of the first intermediate image encompassed by the second structure element and forming positionally corresponding pixels of the second intermediate image in accordance with a second erosion rule, which defines resetting each of the plurality of pixels of the second intermediate image corresponding to the second structure element if a comparison condition with regard to a brightness value difference is fulfilled for a plurality of pixels of the input image corresponding to the second structure element;

d3) moving the second structure element in a step-by-step manner within the first intermediate image and repeating step d2) until the second intermediate image is generated; and e) forming a difference image with the binary image and the second intermediate image, the difference image containing edges.

7. The method according to claim 6, which comprises calculating the brightness value difference from horizontally and vertically adjacent pixels of the input image corresponding to the second structure element of the first intermediate image.

8. The method according to claim 6, wherein the first structure element and the second structure element each encompass four pixels disposed directly next to one another.

* * * * *